United States Patent
Lorrain et al.

(10) Patent No.: US 6,636,512 B1
(45) Date of Patent: Oct. 21, 2003

(54) SYSTEM, METHOD, AND ARTICLE OF MANUFACTURE FOR INCREASING LINK BANDWIDTH UTILIZATION IN A HIGH SPEED DIGITAL NETWORK

(75) Inventors: Jean Lorrain, Vence (FR); Jean-Pierre Marce, St Jeannet (FR); Pascal Thubert, Vence (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/360,507

(22) Filed: Jul. 26, 1999

(30) Foreign Application Priority Data

Jul. 31, 1998 (EP) .............................. 98480052

(51) Int. Cl.[7] .............................................. H04L 12/28
(52) U.S. Cl. ....................................... 370/392; 370/401
(58) Field of Search ................................ 370/235, 389, 370/392, 397, 466, 401, 409

(56) References Cited

U.S. PATENT DOCUMENTS

| | | | |
|---|---|---|---|
| 5,274,643 A | * 12/1993 | Fisk | 370/238 |
| 5,313,454 A | 5/1994 | Bustini et al. | 370/13 |
| 5,448,564 A | * 9/1995 | Thor | 370/392 |
| 6,148,000 A | * 11/2000 | Feldman et al. | 370/397 |
| 6,237,029 B1 | * 5/2001 | Master et al. | 709/217 |

FOREIGN PATENT DOCUMENTS

EP          0706297 A1   4/1996  ........... H04Q/11/04

OTHER PUBLICATIONS

Conta et al, Use of Label Switching on Frame Relay Networks, Nov. 21, 1997, IETF Internet–Draft (draft–conta–mpls–fr–01.txt).*

Blake et al, ARIS Support for LAN Media Switching, Mar. 1997, IETF Internet–Draft (draft–blake–aris–lan–00.txt).*

* cited by examiner

*Primary Examiner*—Chau Nguyen
*Assistant Examiner*—Keith M. George
(74) *Attorney, Agent, or Firm*—Winstead, Sechrest & Minick; Robert A. Voigt, Jr.

(57) ABSTRACT

A system, method and article of manufacturing for increasing link bandwidth occupation in a high speed packet switching digital network by enabling merging the traffics provided by different source users over several network node entry ports and to be propagated throughout network paths toward a same destination network port. To that end, at network ingress, the original packets provided by said source users and entering the network, are encapsulated with a so-called Single Sided Virtual Channel (SSVC) header including a Data Link Connection Identification (DLCI) field. Then, the packets provided by said source users and entering a given network node along their predefined path are monitored. Said packets SSVC headers DLCI fields are loaded with a same Virtual Channel number, whereby the corresponding traffics are being merged into a same channel, down to the destination network node. Then, the packets in said destination node are de-encapsulated from said SSVC header.

24 Claims, 5 Drawing Sheets

SWITCHING TABLE

| L1 | DLCI1 | L'1 | DLCI1' |
|----|-------|-----|--------|
|    |       |     |        |

T1 ... Tn are Frame Relay terminating Equipment
S1 ... Sp are FR SSVN backbone switches
I1 ... In are FR SSVN ingress switches
E1 ... En are FR SSVN egress switches
D1 ... Dq are DLCIs

FIG. 8

| | | | | |
|---|---|---|---|---|
| S1/R1 | L1 | 16 | L4 | 16 |

| | | | | |
|---|---|---|---|---|
| S2/R2 | L2 | 16 | L4 | 17 |

| | | | | |
|---|---|---|---|---|
| S3/R3 | L3 | 16 | L4 | 18 |

SYSTEM, METHOD, AND ARTICLE OF MANUFACTURE FOR INCREASING LINK BANDWIDTH UTILIZATION IN A HIGH SPEED DIGITAL NETWORK

FIELD OF INVENTION

This invention relates to a fully transparent method for optimizing link bandwidth occupation in high speed digital networks, and a system for implementing said method which is particularly adapted to conventional Frame Relay networks. This method is transparent to conventionally existing user's equipment and enables network interoperability.

BACKGROUND ART

Modern communication facilities are made to operate over different transmission media and interconnect, upon request, a very large number of users and applications through complex digital communication networks.

Due to the variety of users' profiles and distributed applications, the corresponding traffic is becoming more and more bandwidth consuming, non-deterministic and requiring more connectivity. This has driven the emergence of fast packet switching network architectures in which data, voice and video information are digitally encoded, chopped into fixed or variable length packets and transmitted through a common set of nodes and links interconnected to constitute the network communication facilities.

An efficient transport of mixed traffic streams on very high speed lines (herein also designated as links or trunks), for these new network architectures, generates a set of requirements in terms of performance and resource consumption including a very high throughput and a very short packet processing time, flexibility to support a wide range of connectivity options, efficient flow and congestion control. Congestion resulting in network performance degrades due to saturation of network resources such as communication links bandwidth, processor cycles, memory buffers, etc.

One basic advantage of packet switching techniques (as opposed to so-called circuit switching techniques) is to allow statistical multiplexing of the different types of data over a line which optimizes the transmission bandwidth. The drawback, however, is that packet switching introduces delays and jitter which might be detrimental for transmission of isochronous data, like video or voice. This is why methods have been proposed to control the network in such a way that delays and jitter are bounded for every new connection that is set up across the packet switched network.

These methods have been described, for instance in a European Application published with number 0000706297 (Method for operating traffic congestion control in a data communication network and system for implementing said method). Said methods include, for any source end-user attached to the network requesting its data to be transported over the network toward a destination end-user also attached to said network, establishing a path through the network high speed lines (links or trunks) and nodes via an entry node port of said network to an indicated destination node using an optimal amount of the available bandwidth of the network.

Due to the very nature of any given source of traffic, a discrimination has to be made among said traffic natures by assigning different priorities. In other words, qualities of service (QoS) are specified in terms of maximum delay (T_max) and packet loss probability (P_loss) upon a source equipment requesting being connected to a destination equipment via the network (i.e., at call set-up time) and based on the nature of the traffic provided by said involved source.

To that end, the QoS and traffic characteristics (e.g. peak rate, mean rate, average packet length) specified and agreed upon by both parties (source owner and network management) are used to compute the amount of bandwidth. For instance, this amount may be equal to the equivalent capacity (Ceq) of the connection to be reserved on every line on the route or path assigned to the traffic between source equipment and destination equipment in order to guarantee a packet loss probability which is smaller than the loss probability (P_loss) that has been specified for the connection. In operation, the network traffic must be controlled dynamically requiring that some packets be dropped within the network to avoid traffic jamming. These packets are flagged as discardable packets through use of a so-called Discardable Eligibility (DE) identifier bit.

In practice, it is common to reserve bandwidth for high priority packets, (e.g. so-called Real Time (RT) traffic) derived from committed QoS traffic, which are transmitted in preference to lower priority packets derived from discardable traffic (e.g. Non Real Time (NRT) traffic or more particularly Non Reserved (NR) traffic). Accordingly, lower priority traffic, (e.g. NR traffic or NRT traffic) sent at a higher rate than their declared rate, is managed to dynamically take advantage of any bandwidth remaining after all the higher priority traffic has been served. This remaining bandwidth can vary widely depending on the actual activity of the high priority traffic sources. It is therefore of considerable importance to manage the low priority traffic so as to optimize the use of the widely varying left-over bandwidth in the network while avoiding any congestion which would reduce network throughput. This requires providing the network (and eventually also the sources) with congestion detection and flow control facilities.

In the domain of flow control mechanisms for non-reserved (NR) traffic, various solutions have already been proposed.

Several mechanisms have been implemented with flow control which can be used on ATM or PTM traffic, the latter providing variable length packets as used in the so-called Frame Relay network (FR) operation, both offering good performance.

One of these mechanisms was disclosed in U.S. Pat. No. 5,313,454 which made the system transparent to the user (source) by providing an internal congestion avoidance method. To that end, congestion is identified throughout the network forward path and identified by setting an indicator in the packet header. Such an indicator is sometimes referred to as a Forward Explicit Congestion Notification (FECN) indicator. Congestion status indicators are used in the destination node either to generate therein a rate control message which is then fed back to the entry node, or to simply notify the traffic originating entry node with a so-called Backward Explicit Congestion Notification (BECN) indicator. This method can generate important overhead in the feedback flow if smooth and flexible congestion control is desired, otherwise the flow regulation would be quite rigid and basic.

In any case, network/link bandwidth occupation should be optimized. To fully appreciate this requirement, one may consider the current link leasing price rates. For instance, the prices in Europe for so-called OC3/STM1 links may be on the order of $100K per 100 Km per month.

Accordingly, any method and means which would enable increased link bandwidth occupation in a high speed digital communication network would be most welcomed.

More particularly, multiplexing techniques enable connecting of several end users on a common physical link by defining so-called Virtual Channels (VC). For instance, switched networks such as Frame Relay (FR) networks and Asynchronous Transfer Mode (ATM) networks are becoming the standard way of networking within Wide Area Networks. One defines as many end-to-end full duplex virtual channels as there are end-to-end connections via the network. Customers find it economically attractive to suppress Internet Protocol network layer (so-called layer3) regional concentration points (e.g. 3745/NCP), instead choosing to define many small channels between any given central site (host) and local terminals that are located in branches. One problem associated with this new topology is that bandwidth is now allocated and controlled by a very large number of very small channels. This burdens the network nodes/switches and results in an underutilisation of bandwidth and increased costs as the carriers charge by the number of virtual channels. One solution currently used to save bandwidth is using concentrators to concentrate several small channels into a common channel. This obviously requires additional equipment which also impacts the cost. Also, it raises additional problems as it adds "hops" to the path and underutilises bandwidth because of granularity considerations.

OBJECTS OF THE INVENTION

One object of this invention is to provide a method and system to enable increased link bandwidth occupation while avoiding the use of concentrators with a network connecting local end users to a remote station.

Another object of this invention is to provide a user transparent method and system to concentrate small individual users' traffics over a same virtual channel in a Frame Relay network.

A further object of this invention is to provide a user transparent method and system to concentrate small individual users' traffics over a same virtual channel that can be easily implemented in currently available Frame Relay networks.

Still another object of this invention is to provide a user transparent method and system to concentrate small individual users' traffics over a same virtual channel that is fully interoperable with networks not implementing the invention.

SUMMARY OF THE INVENTION

A method and system for optimizing link bandwidth occupation in a high speed packet switching digital network is provided by merging the traffics provided by different source users over several network node entry ports, the traffics propagated throughout network paths toward a same destination network port, by:

monitoring, at network ingress, the original packets, each including a conventional (standardized) packet header and a data payload, provided by said source users, and encapsulating each of said packets entering the network with a so-called Single Sided Virtual Channel (SSVC) header having control bytes including a Data Link Connection Identification (DLCI) field;

monitoring the packets provided by said source users and entering a given network node along its predefined path, and loading each of said packets SSVC headers DLCI fields with a same Virtual Channel number, whereby the corresponding traffics are being merged into a same channel to the destination network node; then, monitoring the traffics in said destination node and de-encapsulating each corresponding packet from said SSVC header.

The above mentioned objects, characteristics and advantages of this invention will be made more apparent from the following description of a preferred embodiment of the invention made with reference to the attached figures.

BRIEF DESCRIPTION OF THE FIGURES

FIG. 8 illustrates an example of the operation of the present invention.

DETAILED DESCRIPTION OF A PREFERRED EMBODIMENT OF THE INVENTION

Figure 1:
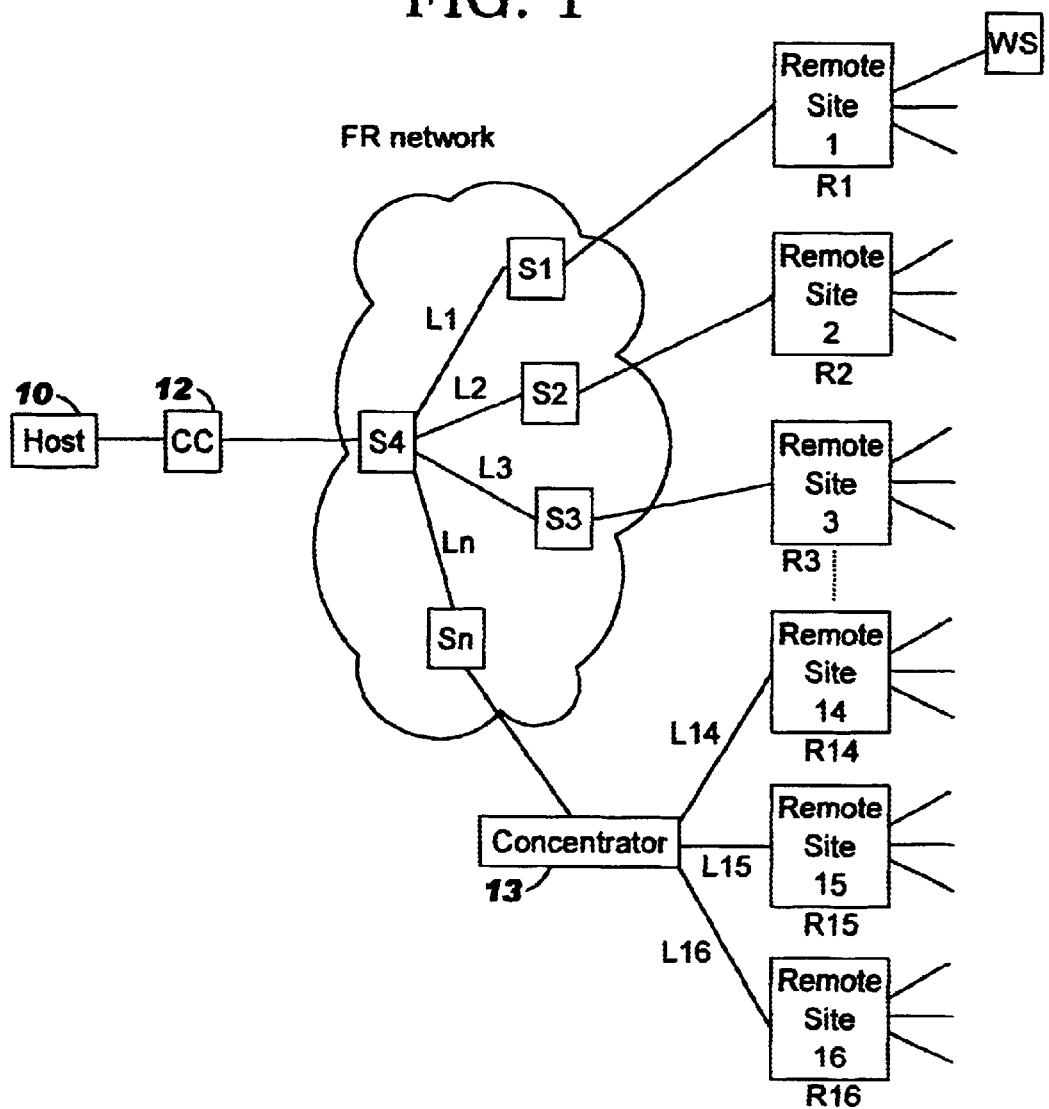
FIG. 1 illustrates a prior art solution to the problem addressed by the invention.

FIG. 1 illustrates the problem addressed by the invention. For instance, a banking system with several Remote Sites stations (R1, R2, . . . ) to be connected to a Data Center Host (10) via a high speed data communication network, e.g., a Frame Relay (FR) network. The network is conventionally made with so-called Switching Nodes (herein also simply referred to as Switches (S) or Nodes) interconnected by high speed links (L1–Ln). Each Remote Site equipment (e.g. a concentrator or router) is connected to local terminals or Work Stations (WS). The traffic provided by local users' terminals (WS) to a site station is concentrated therein over a Permanent Virtual Channel (PVC) and then through the Frame Relay network down to the Host (10) via a Communication Controller (CC) (12) or router. In operation, the number of work stations (WS) attached to the same remote site routers (14, 15, 16) may actually vary between two or three workstations and up to forty or fifty workstations. This raises problems with bandwidth assignment to site routers (14, 15, 16). As already mentioned, not only the number of workstations (WS) attached to a same routers (14, 15, 16) may vary but, in operation, the traffic provided by each workstation may fluctuate at random thus causing the link bandwidth occupation to fluctuate accordingly.

To avoid traffic congestion, a Quality of Service (QoS) to terminals is contractually defined. This enables setting a corresponding committed bandwidth for so-called committed traffic for network attached users' workstation.

The total committed bandwidth for any given path between an entry mode and an exit mode within the network shall be adjusted up to a predefined percentage of the normal link bandwidth to minimize the chance of traffic jamming occurring. Further, improving the bandwidth occupation during operation, given the actual cost of that bandwidth, is a must. To that end, a portion of the remaining nominal link bandwidth has been made available to so-called excess traffic bearing in mind that the corresponding excess bandwidth shall be assigned dynamically to network users. This excess bandwidth could be taken back from users in case of network congestion anywhere along the network path from source user (e.g., workstation) to target user (e.g. host). To achieve this, the data packets (or frames) corresponding to excess traffic are flagged as droppable frames using the so-called Discard Eligibility (DE) bit field conventionally provided within the frame header. All these operations are conventionally controlled by network control functions which are implemented within the network to control, allocate and manage the resources of the physical network. In other words, a number of facilities are already provided within the network to improve bandwidth occupation and yet further improvements are still required to take into consideration a number of still remaining problematic parameters. For instance, consider small remote site stations, i.e. those serving a fairly small number of workstations, e.g. two or three workstations. The required bandwidth of these small remote site stations would then be fairly small. Now if these remote sites are connected by a physical link to the Frame Relay network and then by a logical link through the Frame Relay network to the Host station (10), some bandwidth might be underutilised.

A conventional solution to this problem, as implemented in the art, uses an additional concentrator (see (13) in FIG. 1). FIG. 1 shows two remote site stations used as routers (R14 and R15) grouping the traffic of remote workstations (not shown) over physical links L14 and L15) respectively. Assuming these physical links are conventional 28 Kbps links, then the concentrator (13) may be connected to the Frame Relay network via a conventional 64 Kbps physical link and then be assigned a single Permanent Virtual Channel throughout the Frame Relay network down to the Communication Controller (12) and then to the Host (10). This solution saves one Permanent Virtual Channel within the network but it is far from being optimal. First, the concentrator is an additional piece of equipment having a serious impact on cost/efficiency considerations. The concentrator also needs to be near the remote sites (R14) and (R15) again for cost/efficiency and time delay considerations on L14 and L15. Finally, one has to consider link bandwidth granularity. For example, concentrating two 28 Kbps over a 64 Kbps link wastes 8 Kbps. If a third remote station (R16) is located close to the concentrator (13) and may be handled by said concentrator (13), then the concentrator would require an additional link (e.g. 64 Kbps link) to be connected to the Frame Relay network, which increases the overall waste in link bandwidth occupation.

In summary, the above mentioned solution is inefficient, both requiring additional equipment and wasting the bandwidth occupation in the communication network due to the granularity in available link capacity.

The present invention provides a method and system for avoiding the shortcomings of the prior art by dynamically concentrating, within the network, the traffic due to exit the network through a same network node port, with almost no additional hardware being required. The solution is easily implemented in currently used networks and fully transparent to network attached users (e.g.; remote site stations and Workstations). More precisely, the traffic as managed herein shall converge and be aggregated as in a river flow: the closer one gets to the destination, the more the end-to-end traffic on one-way connections to the physical exit port is concentrated. When two traffics are merged into one, it can be expected that the bandwidth that should be reserved for the corresponding traffic sum would be statistically less than the mathematical sum of bandwidth reservations that would be required for the individual traffics. The end result is that a given end-to-end Permanent Virtual Channel uses less and less total bandwidth reservation on intermediate hops when approaching the destination.

The many advantages of the present invention will become fully apparent from the following description of a preferred embodiment. If a packet is sent on excess bandwidth, the more it is propagated over the network to the target, the more chances it has statistically to be incorporated into the committed bandwidth of the aggregated traffic. Thus, the more the network has invested in propagating the packet, the less chances are that this packet might be dropped along its path to the target.

Also, while the invention applies essentially to Frame Relay networks, it could also be adapted to other types of networks. The invention makes connection establishment faster and easier, and limits the definitions in the network. Virtual Channel handling, in particular is highly simplified.

A number of additional advantages of this invention will also become more apparent. These advantages include:
 no modification of the network interface from the user side is required;
 networks supporting the invention will still interoperate with networks not implementing the invention;
 jitter should be better than with traditional virtual channels, as the available bandwidth broadens along a packet path;
 the application can scale-up (using several layers of encapsulations as described hereunder).

Figures 2, 4:
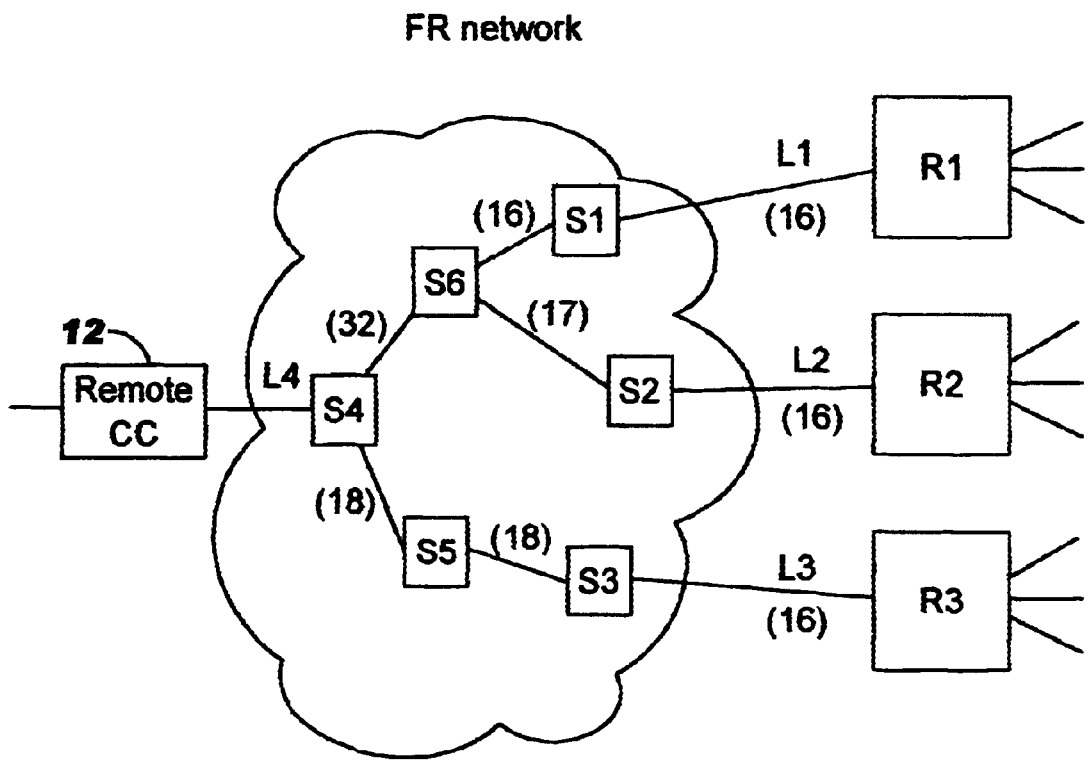
FIG. 2 illustrates an example of the present invention.
FIG. 4 represents a node Switching Table used in Frame Relay networks.

FIG. 2 illustrates one implementation of the present invention on three Remote Sites feeding the Communication Controller (12) of FIG. 1. These remote sites are labeled (R1), (R2), and (R3) respectively. The Frame Relay network has been made to include six Switching Nodes labeled S1 through S6. The remote sites R1, R2 and R3 are connected directly to entry-port switching nodes S1, S2 and S3 via the links L1, L2 and L3, respectively. For purposes of illustration only, assume that the links L1, L2 and L3 are 28 Kbps links. Similarly, assume that Controller (12) all exit the Frame Relay network via the same switching node S4 coupled to Communication Controller (12) via link L4. The traffic provided by R3 on link L3 over a predefined Permanent Virtual Channel (PVC) to the switch S3 goes to switch S5 then to S4, while the traffics provided by R1 and R2 on links L1 and L2, also on Permanent Virtual Channels, both converge on S6 and then go through S4 to the Communication Controller (12) and the host (not shown). The invention enables concentrating in S6, with the above mentioned traffics exiting S1 and S2 on a same Logical Channel (LC) and then concentrating again in S4 those traffics exiting S5 and S6 over a same Logical Channel.

Accordingly, the result is that the three 28 Kbps nominal bandwidth of L1, L2 and L3 shall be concentrated over a 64 Kbps link exiting S4. This not only eliminates additional equipment (like the concentrator 13 of FIG. 1), but permits one 64 Kbps link to be statistically sufficient to handle the three nominal 28 Kbps traffics. These advantages shall be obtained with no additional requirements on the network user's equipment.

Any Frame Relay packet includes a variable length payload with the user's data (e.g. workstation data), encapsulated by a fixed length so-called FR header (herein also designated as standard or conventional header), defined by international standards. The header identifies the packet as a so-called Packet Type Multiplexing (PTM) packet and contains a number of parameters to be used to control processing and to properly orient, as required, the considered packet within each network Switching Node. To that end, each of said switching nodes includes input adapters for storing in the node incoming packets, output adapters for storing packet to be fed to node output ports and a so-called Switch Fabric arrangement to aid in switching the packets from input to output adapters. The node also includes routing capability to control routing each incoming packet from node input to node output adapter through the Switch Fabric.

Figure 3:
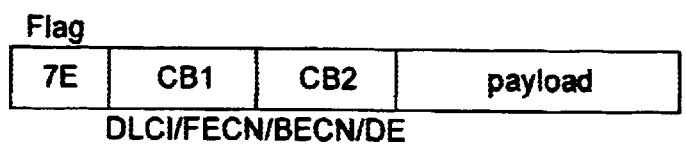
FIG. 3 represents a Frame Relay packet format.

The Control Bytes (CB) defined within the PTM packet header are shown in FIG. 3. Represented therein is the so-called flag (7E), identifying the beginning of the PTM packet, and two control bytes (CB1 and CB2). Ten out of the sixteen bits of CB1 and CB2 (e.g. six bits in CB1 and four bits in CB2) are used as Data Link Communication Identifier (DLCI) or, in other words, as a logical number identifying a Permanent Virtual Channel (PVC). These logical numbers may start, for instance, with the number 16 (decimal value equal 16) and then be incremented as required when configuring the network. Also included within the two-byte CB1 and CB2 are a one-bit field for storing the Discardable Eligibility (DE) bit and two other fields for storing, therein, the Backward and Forward Explicit Congestion Notification indications (BECN and FECN respectively).

Represented in FIG. 4 is a so-called node Switching Table identifying IN/OUT correspondences of Data Link Channel Identifications. For instance, FIG. 4 shows a connection on link L1 entering a switching node with a Data Link Connection Identifier DLCI1 and exiting said node on link L'1 with a Data Link Connection Identifier DLCI1'. A port mapping table allows a node to recognize that a port is not local but remote, that is not physically on the ingress but via an SSVC on a given physical port (so IN is: remote port, OUT are: SSVC and real port).

A spanning tree may be used to build the path to each port across the SSVC network. This works for reasonably sized networks. Alternatively, a PNNI, or the like, protocol can be used to build the paths and port mapping tables. The table may also be configured by administrators. The swapping table can be manually configured, or configured via tools and protocols.

Returning to FIG. 2, it is assumed that the traffics entering the network over links L1, L2 and L3 and via the nodes S1, S2 and S3 are all identified with DLCIs (16). Switching Tables of S1, S2 and S3 have been personalized to identify the corresponding outputs with DLCIs (16), (17) and (18) respectively. The Switching Table in node S5 may match DLCI out by number (18) as corresponding to DLCI-in equal to (18). But while with the prior art the DLCIs out of node S6 corresponding to the DLCIs in (16) and (17) requires two DLCI numbers be identified (e.g. 16 and 17), the invention shall enable merging the two traffics into a single DLCI, e.g. herein identified by number (32) and thus, more simply and transparently to the user, can be implemented on currently operating networks. To that end, the Frame Relay packet is herein encapsulated with an additional header ("Added Header"). The additional header may include a two-byte long field structured as the standard PTM header. The new structured packet shall also start with a flag (7E) and a recomputed Cyclical Redundancy Check (CRC) shall be appended to the modified packet which is used as a Frame Check Sequence (FCS). Then, as in the case of FIG. 2, for all packets entering node S4 with a DLCI equal to 16 or 17, the above mentioned encapsulating header (Added Header) shall be made to include a DLCI equal to 32 (see FIG. 2).

This is equivalent to creating a new (one way) type of Frame Relay virtual channel herein designated as a Single Sided Virtual Channel (SSVC).

The added header can be considered a bearer DLCI and is only valid within the SSVC network. It is used to carry a packet between the ingress and the egress of the SSVC network. The SSVC network acts as a single node (network in the box). Typical FR DLCIs are locally significant whereas bearer DLCIs (SSVCs) are not, as the former uniquely name a port in an egress node of the SSVC network. The real target DLCI is put in the packet after the SSVC DLCI. The traditional FR switching function is performed by the combination of the twp edges of the SSVC network. The egress is seen by the ingress as a 'remote' outgoing port, as opposed to a standard port. The ingress does the mapping in real DLCI to out real DLCI. Then the ingress puts the packet on the remote port by putting it on a real port with the bearer DLCI added in front. When the egress gets the packet with the bearer DLCI, it next identifies the destination port. This can be done using a swapping table entry that has no output DLCI associated with the bearer DLCI such that the egress can strip the bearer DLCI and put the packet on the port from the packet's non-bearer DLCI or real port.

SSVC switching operation allows many IN and one OUT, which means that traffic may be received for a given SSVC over several ports which can be switched over the same output port.

For instance, in switching Node S4, all traffic with DLCI= 18 or DLCI=32 (the latter combining DLCI=16 and DLCI= 17) shall be merged into the same DLCI in the so-called "Added Header" also herein designated as "SSVC Header". At the exit port of S4, by dropping the SSVC header, one shall recover the original traffics of Workstations R1, R2 and R3 through the Data Link Connection Identifiers 16, 17 and 18 in the original standard PTM packet header.

Congestion control may also be accomplished. Congestion is a situation which might occur in any Switching Node of an established connection. Conventional network nodes are provided with means for monitoring node traffics. The aim of the congestion control facilities is to check the traffic to detect congestion in any network node and then monitor and control the subsequent traffic on the considered connection from network entry port to exit port in order to overcome traffic congestion as smoothly and flexibly as possible. Monitoring the data flow in a transit switching node along a forward path connection between a source user and a target user, can be achieved by considering one or several predefined threshold levels in node adapters packet queues. Based on overthresholding indications, the Forward Explicit Congestion Notification (FECN) field can be set accordingly. In the present example, we shall assume that FECN and BECN fields are one bit long. This FECN bit, once set ON, is carried as such to the corresponding network exit node. Then, in said exit node, the incoming traffic is monitored to track the FECN indication. Should this FECN bit be set ON, the original traffic source or the original network entry node to which said source user is attached should be made aware of the congestion situation. To that end, the Backward Explicit Congestion Notification (BECN) bit is set ON in the traffic sent back to the source user. This operation may occur over a different path, in other words, forward and backward paths within the network may differ from each other. This fits perfectly with the present invention as long as the FECN and BECN bit positions monitored and controlled during operation are located in the SSVC header and then are reported into the original conventional packet header at the network exit node.

Recall that the Discardable Eligibility (DE) bit is located in SSVC header. When a traffic jam occurs in any network node, the discardable flagged packet being considered should be dropped immediately. Thus, the DE bit value may simply be ignored when dropping the SSVC header at the network exit node.

The above considerations demonstrate why the SSVC header format has been selected to be similar to the standard header format in this embodiment.

Figure 5:
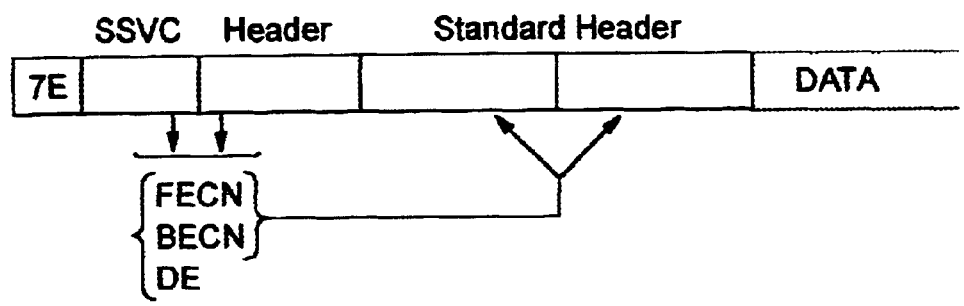
FIG. 5 shows a modified packet used to implement the invention.

The modified PTM packet to be used in this embodiment is structured as represented in FIG. 5. It includes the conventional flag (7E) and then a two-byte long SSVC header (as represented in FIG. 3). This SSVC header encapsulates the conventional PTM packet including the two-byte long standard packet header, followed by the variable length data field. While the modified packet is propagated within the network along its assigned path, the BECN, FECN and DE fields made operative as mentioned above, are those belonging to the SSVC header. When the packet reaches its network exit node, the SSVC BECN/FECN fields contents are reported into the standard packet header. Since in the preferred embodiment of this invention the Discard Eligibility is made operative in any congested network node on the selected forward path of the considered connection, there is no need to report the DE bit value into the standard PTM header.

Figure 6:
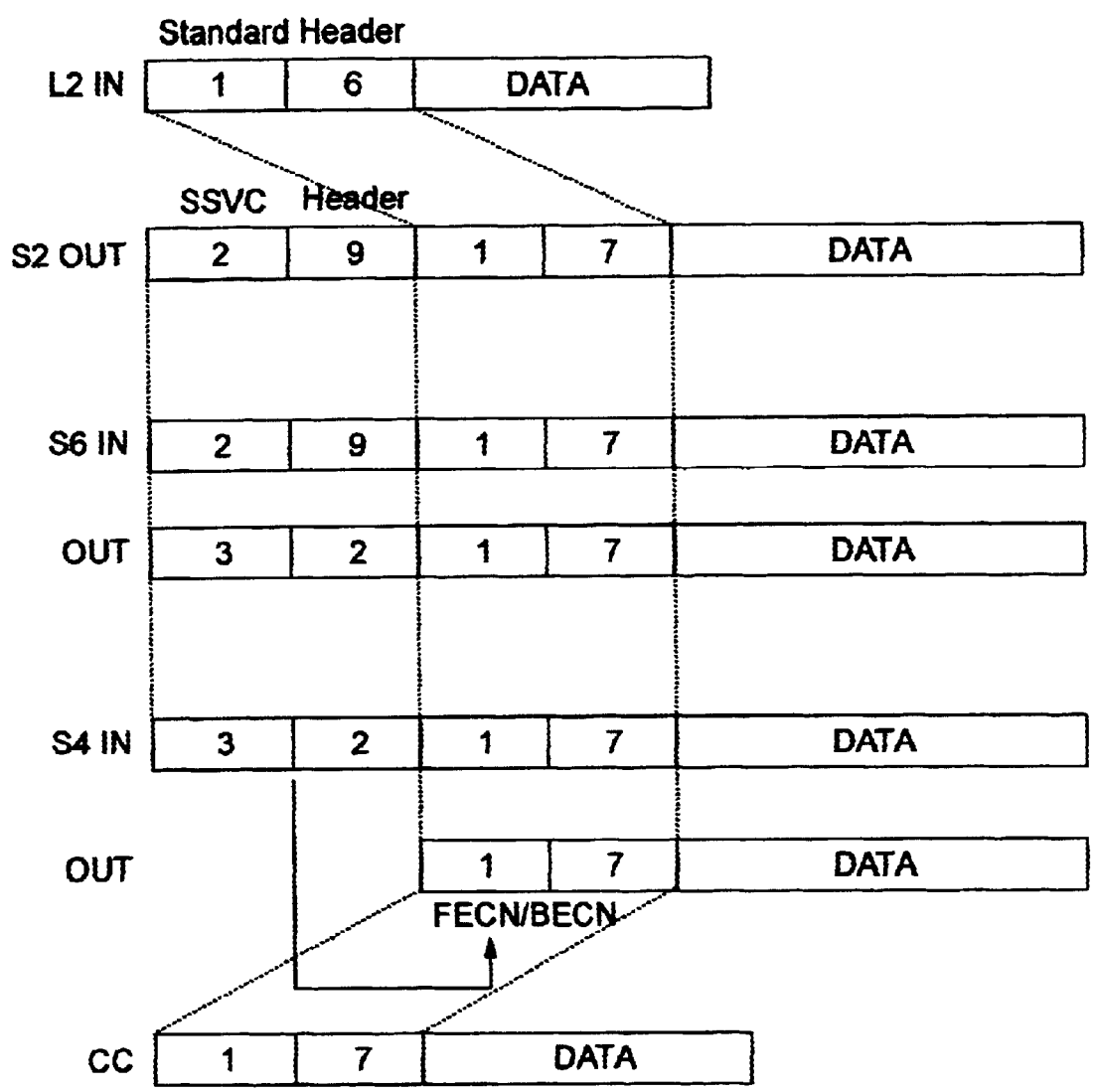
FIG. 6 illustrates an example of operation of the present invention.

FIG. 6 illustrates the preferred invention operation by considering the process from Site Station R2 to the remote Communication Controller 12 (see FIG. 2). The packet entering S2 includes a standard header with a DLCI=16 (herein illustrated schematically by a "1" in the first DLCI portion (e.g. CB1) location and a "6" in the second portion). Before exiting the Node S2, the packet is encapsulated with the SSVC header and a new DLCI dummy value (e.g. 29). This packet enters Node S6 with a DLCI=29 in the SSVC header and 17 in the standard header field. The SSVC header section is modified within S6 to exit the node with DLCI SSVC header section including 32, while the standard header remains unchanged (naturally this assumes that the DE did not operate, i.e. no congestion occurred). This same packet enters then the node S4 as such. Since along the way from S2 to S4 the BECN/FECN fields were updated only within the SSVC header, these fields contents are reported (logic OR function) into the standard header field (DLCI=17) prior to simply dropping the SSVC header within S4. The standard PTM packet is then forwarded to the Communication Controller (CC) (12) over channel 17.

The same kind of processing would be applied over the traffic from R1, and DLCI=32 would be reported into the corresponding SSVC field, within S6, while the standard header shall include a DLCI=16. Thus, both R1 and R2 traffics will be concentrated over the same channel (i.e. DLCI 32) thanks to the SSVC header operation.

When a DLCI is added, its committed bandwidth is added to that of each hop down the SSVC stream with a configurable reduction coefficient that depends on the number of incoming Virtual Channels that are merged on the last hop. Also, one can decide to let the coefficient be equal to one or perhaps set it to a higher value if the network uses a lot of excess bandwidth.

Figure 7:
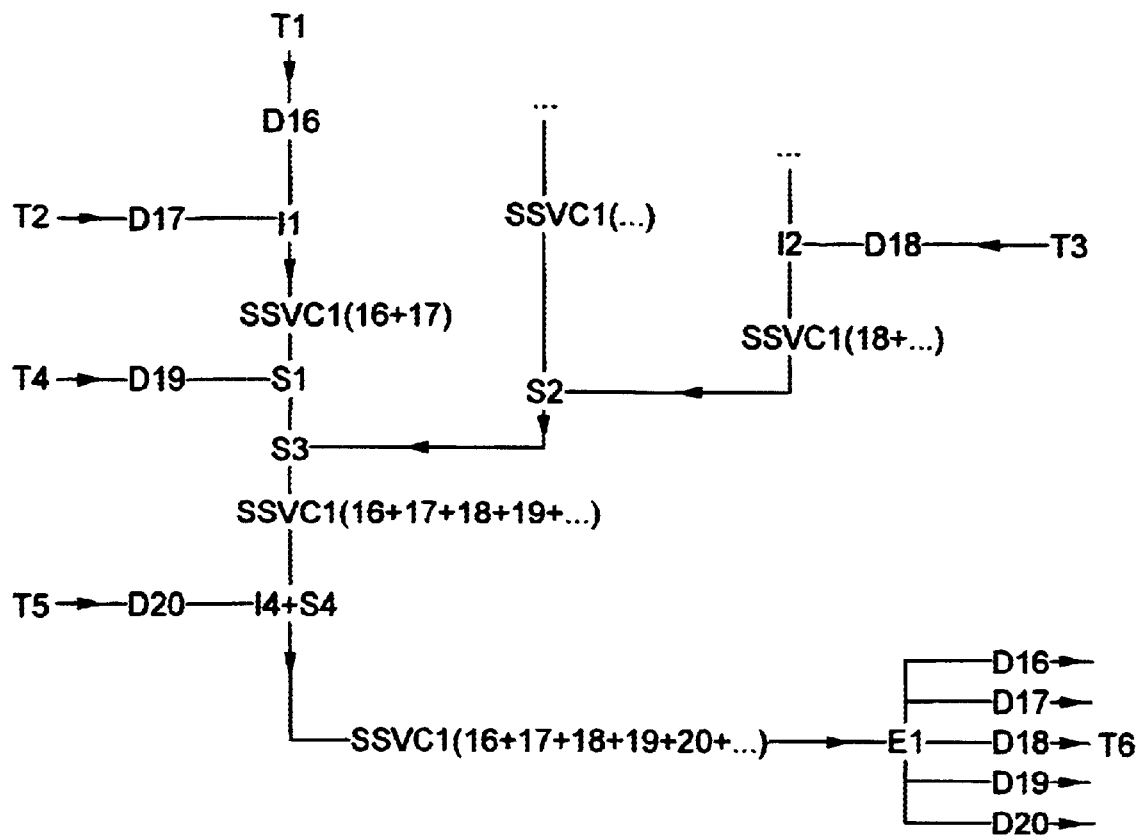
FIG. 7 shows an application of the invention in a more complex situation.

A network somewhat more complex than the network of FIG. 2 has been represented in FIG. 7 to illustrate the "river-like" concentration of traffics from different sources toward a same output channel. The traffics provided by Frame Relay terminating equipments T1 to Tn (e.g. remote concentrators) converge into backbone network switches (S1 to Sp). In addition, a distinction between network ingress switches and egress switches, throughout the network, is being made in FIG. 7 by labelling the former I1 to In and the latter E1.

As shown in the figure, the traffics from T1 and T2 being on DLCIs 16 and 17, (herein labelled DL16 and DL17 respectively), are first concentrated over a same channel with SSVC1 merging DLCIs 16 and 17. Next, the traffic of DLCI 19 is added in the Switch S1. Similarly, the Switch S2 concentrates the traffic of DLCI 18 with some other traffic (not identified in the figure and represented by (. . .). Both traffics from SI and S2 converge into S3 thus providing a Single Switch Virtual Channel traffic identified as SSVCI (16+17+18+19+ . . . ), thus encapsulating frames for transporting the corresponding DLCIs over the same channel. Next, an ingress switch I4 adds DLCI 20 into the backbone Switch S4. Finally, the concentrated traffic reaching the egress Switch E1 is properly oriented toward the respective destinations by dispatching DLCI's 16, 17, 18, 19, 20 . . .

The above operations have been made much simpler by swapping, (e.g. using a predefined Swapping Table preloaded in the Switch at the ingress), the DLCIs in the original packets with the DLCI numbers of the destination egress port. At the egress, (e.g. E1), each packet is de-encapsulated from the SSVC header, and the congestion bits (FECN and BECN) are logically OR'd with the bits found in the DLCI header which are then conventionally processed according to the defined congestion procedure. Each packet is then transmitted over the network port out and toward its final destination.

An example of swapping tables is represented in FIG. 8, as the so-called Added Swapping Table, to enable properly reassigning DLCI numbers. This table is thus personalized into the ingress switches as required. The example of FIG. 8 illustrates the situation of FIG. 2; in that case, in S1 and coming from R1, the DLCI 16 for link L4 is kept unchanged. In S2, from R2, DLCI 16 from L2 and for L4 is converted into DLCI 17; in S3, coming from link L3, DLCI 16 for L4 is converted into DLCI 18.

In summary, the network encapsulates each processed packet with a private header indicating the one way connection to the output port where de-encapsulation and delivery should take place. The process is thus made transparent to users, which is a most valuable advantage of this invention from both design engineering and cost efficiency standpoints. In addition, should the network be extended or interconnected with different networks, no problem of compatibility would be raised and straightforward interconnection is made possible. Mixed types of traffics can also be processed.

Any of the Frame Relay standard header formats (2, 3 or 4 bytes) can be used as a SSVC header, depending on the number of SSVCs (that is, outgoing ports) in the network. Yet, it is recommended to use several encapsulating layers of two-byte long DLCI headers rather than larger DLCI headers for easier interoperability with existing networks.

Many of the functions and operations of the present invention can be embodied in software and carried out on a suitable microcontroller, processor, computer, router, switch, node and/or DSP. The software may be distributed on a computer usable medium such as floppy disk, diskettes, CD-ROM, PCMCIA cards, flash memory cards and/or any other computer usable medium. Note that the software system may also be downloaded from a network server such as a Internet site accessible via any communications adapter.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

Having this described our invention, what we claim is as follows:

1. A method for increasing utilization of link bandwidth occupation in a high speed packet switching digital network, said method comprising the steps of:
   receiving original packets at a network ingress node from one or more sources, each original packet having a standard packet header and a data payload, the standard packet header containing control information including a first Data Link Connection Identification (DLCI) field, the first DLCI used in identifying links of a predefined path from the ingress node to a egress node;
   encapsulating each of said received original packets with a Single Sided Virtual Channel (SSVC) header containing control information, the control information including a second Data Link Connection Identification (DLCI) field;
   loading the second DLCI field of each encapsulated packet SSVC header with a virtual channel number where packets destined for the same egress node exit port have a common virtual channel number;
   merging packets having common virtual channel identifiers on common exit ports in the network; and
   de-encapsulating the SSVC header from received packets at the egress node exit port.

2. The method according to claim 1, wherein at any network ingress node, the first DLCI is swapped to the corresponding DLCI number of the egress node port.

3. The method according to claim 2 wherein said network is a frame relay network where the data payload is of variable length and the standard packet header is of fixed length, and wherein each SSVC header includes frame relay congestion control fields to enable congestion control at each network node along the predefined paths and where each SSVC congestion control field contents reported into the standard packet header prior to the packet exiting the egress node.

4. The method according to claim 3 wherein the frame relay congestion control fields include:
   a Forward Explicit Congestion Notification (FECN) field,
   a Backward Explicit Congestion Notification (BECN) field, and
   a Discardable Eligibility (DE) field, with the DE field content not reported from the SSVC control field content into the standard packet header prior to the packet exiting the egress node.

5. The method according to claim 4 wherein a merged bandwidth is reserved, for packets having the same virtual channel identifiers, that is set to less than the sum of the bandwidth of said packets if the packets did not have the same virtual channel identifier.

6. A method according to claim 5, wherein each merged bandwidth is assigned a predefined merging coefficient whereby the bandwidth reserved for the merged traffic could be selected to be lower or higher than the sum of the individual merged bandwidth.

7. A method according to claim 3 further characterized in that the SSVC header format is selected to use one or several two-byte standard frame relay header formats.

8. A method according to claim 3 further characterized in that the SSVC header format is selected to use any of the standard frame relay header formats.

9. An article of manufacture comprising a processor useable medium having a processor readable program embodied in said medium, wherein the processor readable program when executed on one or more network nodes causes the network to:
   receive original packets at a network ingress node from one or more sources, each original packet having a standard packet header and a data payload, the standard packet header containing control information including a first Data Link Connection Identification (DLCI) field, the first DLCI used in identifying links of a predefined path from the ingress node to a egress node;
   encapsulate each of said received original packets with a Single Sided Virtual Channel (SSVC) header containing control information, the control information including a second Data Link Connection Identification (DLCI) field;
   load the second DLCI field of each encapsulated packet SSVC header with a virtual channel number where packets destined for the same egress node exit port have a common virtual channel number;
   merge packets having common virtual channel identifiers on common exit ports in the network; and
   de-encapsulate the SSVC header from received packets at the egress node exit port.

10. The Article of manufacture according to claim 9, wherein at any network ingress node, the first DLCI is swapped to the corresponding DLCI number of the egress node port.

11. The Article of manufacture according to claim 10 wherein said network is a frame relay network where the data payload is of variable length and the standard packet header is of fixed length, and wherein each SSVC header includes frame relay congestion control fields to enable congestion control at each network node along the predefined paths and where each SSVC congestion control field contents reported into the standard packet header prior to the packet exiting the egress node.

12. The Article of manufacture according to claim 11 wherein the frame relay congestion control fields include:
   a Forward Explicit Congestion Notification (FECN) field,
   a Backward Explicit Congestion Notification (BECN) field, and
   a Discardable Eligibility (DE) field, with the DE field content not reported from the SSVC control field content into the standard packet header prior to the packet exiting the egress node.

13. The Article of manufacture according to claim 12 wherein a merged bandwidth is reserved, for packets having the same virtual channel identifiers, that is set to less than the sum of the bandwidth of said packets if the packets did not have the same virtual channel identifier.

14. The Article of manufacture according to claim 13, wherein each merged bandwidth is assigned a predefined merging coefficient whereby the bandwidth reserved for the merged traffic could be selected to be lower or higher than the sum of the individual merged bandwidth.

15. The Article of manufacture according to claim 11 further characterized in that the SSVC header format is selected to use one or several two-byte standard frame relay header formats.

16. The Article of manufacture according to claim 11 further characterized in that the SSVC header format is selected to use any of the standard frame relay header formats.

17. A high speed packet switching network comprising:
   a plurality of switching nodes interconnected by high speed links;

one or more ingress nodes, each receiving original packets from one or more sources, each original packet having a standard packet header and a data payload, the standard packet header containing control information including a first Data Link Connection Identification (DLCI) field, the first DLCI used in identifying links of a predefined path from the ingress node to a egress node wherein each received original packets is encapsulated with a Single Sided Virtual Channel (SSVC) header containing control information, the control information including a second Data Link Connection Identification (DLCI) field, the second DLCI field of each encapsulated packet SSVC header is loaded with a virtual channel number where packets destined for the same egress node exit port have a common virtual channel number;

switching nodes for merging packets having common virtual channel identifiers on common exit ports in the network; and at least one egress node, each de-encapsulating the SSVC header from received packets at the egress node exit port.

18. The network according to claim 17, wherein at any ingress node, the first DLCI is swapped to the corresponding DLCI number of the egress node port.

19. The network according to claim 18 wherein said network is a frame relay network where the data payload is of variable length and the standard packet header is of fixed length, and wherein each SSVC header includes frame relay congestion control fields to enable congestion control at each network node along the predefined paths and where each SSVC congestion control field contents reported into the standard packet header prior to the packet exiting the egress node.

20. The network according to claim 19 wherein the frame relay congestion control fields include:

a Forward Explicit Congestion Notification (FECN) field, a Backward Explicit Congestion Notification (BECN) field, and a Discardable Eligibility (DE) field, with the DE field content not reported from the SSVC control field content into the standard packet header prior to the packet exiting the egress node.

21. The network according to claim 20 wherein a merged bandwidth is reserved, for packets having the same virtual channel identifiers, that is set to less than the sum of the bandwidth of said packets if the packets did not have the same virtual channel identifier.

22. The network according to claim 21, wherein each merged bandwidth is assigned a predefined merging coefficient whereby the bandwidth reserved for the merged traffic could be selected to be lower or higher than the sum of the individual merged bandwidth.

23. A method according to claim 19 further characterized in that the SSVC header format is selected to use one or several two-byte standard frame relay header formats.

24. A method according to claim 19 further characterized in that the SSVC header format is selected to use any of the standard frame relay header formats.

* * * * *